(12) United States Patent
Yun et al.

(10) Patent No.: US 9,422,003 B2
(45) Date of Patent: Aug. 23, 2016

(54) SUBFRAME MOUNTING BUSH

(71) Applicant: Hyundai Motor Company, Seoul (KR)

(72) Inventors: Young Dong Yun, Hwaseong-Si (KR); Joon Soo Kim, Hwaseong-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/542,587

(22) Filed: Nov. 15, 2014

(65) Prior Publication Data

US 2015/0375788 A1    Dec. 31, 2015

(30) Foreign Application Priority Data

Jun. 27, 2014    (KR) .................. 10-2014-0079629

(51) Int. Cl.
| | | |
|---|---|---|
| *F16F 7/00* | (2006.01) | |
| *B62D 21/11* | (2006.01) | |
| *B60K 5/12* | (2006.01) | |

(52) U.S. Cl.
  CPC ............. *B62D 21/11* (2013.01); *B60K 5/1216* (2013.01)

(58) Field of Classification Search
  CPC ...... F16F 1/373; F16F 1/3735; F16F 1/3873; F16F 1/3814; B60G 7/02; B60G 99/004
  USPC ....... 267/141–141.7, 292–294; 248/634, 635
  See application file for complete search history.

(56) References Cited

U.S. PATENT DOCUMENTS

| | | | | |
|---|---|---|---|---|
| 4,213,718 A | * | 7/1980 | Lumby .................... | B60G 7/02 248/635 |
| 4,252,339 A | * | 2/1981 | Shimizu ................... | B60G 7/00 280/124.08 |
| 4,286,777 A | * | 9/1981 | Brown .................. | B60G 99/004 248/635 |
| 7,416,174 B2 | * | 8/2008 | Dickson .................. | F16F 15/08 267/141.1 |
| 8,196,911 B2 | * | 6/2012 | Baumbarger .......... | B62D 21/11 267/141.2 |
| 8,939,437 B2 | * | 1/2015 | Kobori .................. | F16F 1/3735 267/140.3 |
| 8,950,738 B2 | * | 2/2015 | Nakamura ............ | F16F 1/3732 267/140.13 |
| 9,010,716 B2 | * | 4/2015 | Kobori .................. | F16F 1/3713 248/635 |
| 2002/0140146 A1 | * | 10/2002 | Nakagawa ............ | F16F 1/3873 267/141.2 |
| 2006/0043654 A1 | * | 3/2006 | Allaei .................... | F16F 3/0935 267/140.3 |
| 2006/0108727 A1 | * | 5/2006 | Hees ........................ | B60G 7/02 267/141.2 |
| 2006/0202400 A1 | * | 9/2006 | Fitzgerald ............. | F16F 1/3732 267/293 |
| 2010/0327502 A1 | * | 12/2010 | Nakamura ............ | F16F 1/3735 267/141 |

FOREIGN PATENT DOCUMENTS

| | | |
|---|---|---|
| JP | 02-212637 A | 8/1990 |
| JP | 06-200980 A | 7/1994 |
| JP | 2002-347650 A | 12/2002 |
| JP | 2005-291228 A | 10/2005 |
| KR | 1998-026374 U | 8/1998 |
| KR | 10-2002-0078282 A | 10/2002 |
| KR | 10-2003-0015037 A | 2/2003 |
| KR | 10-2006-0039486 A | 5/2006 |

\* cited by examiner

*Primary Examiner* — Christopher Schwartz
(74) *Attorney, Agent, or Firm* — Morgan, Lewis & Bockius LLP

(57) ABSTRACT

A subframe mounting bush my include an outer pipe provided in a subframe and divided into at least two or more outer divided parts in a vertical direction, an inner pipe inwardly spaced apart from the outer pipe by a predetermined gap and divided into at least two or more inner divided parts in the vertical direction, and a buffering rubber interposed between the outer pipe and the inner pipe and divided into at least two or more rubber divided parts in the vertical direction.

10 Claims, 6 Drawing Sheets

SUBFRAME MOUNTING BUSH

CROSS REFERENCE TO RELATED APPLICATION

The present application claims priority to Korean Patent Application No. 10-2014-0079629, filed on Jun. 27, 2014, the entire contents of which is incorporated herein for all purposes by this reference.

BACKGROUND OF THE INVENTION

1. Field of the Invention

The present invention relates to a subframe mounting bush divided into a plurality of parts to freely set a vibration insulation feature thereof and improve collision performance depending on occurrence of collision.

2. Description of Related Art

In a vehicle, a subframe, which is mounted at a low portion of a vehicle body, has an engine and a power train of a transmission assembled thereto to support them, and has a suspension connected thereto, ensures structural rigidity of the vehicle and facilitates transfer of a load.

The subframe includes a mounting bush disposed at each mounting part so that vibrations and noise transferred from the power train and vibrations due to impact transferred from a road are not transferred.

The mounting bush 30 includes an outer pipe 32 and an inner pipe 34 mounted at the mounting part (not shown) of the subframe and a buffering rubber 36 interposed between the outer pipe 32 and the inner pipe 34, as shown in FIG. 1.

Recently, the outer pipe 32 has been formed using plastic to allow the mounting bush 30 to be easily separated from the subframe at the time of collision, in order to improve collision performance of the vehicle.

In detail, the mounting bush 30 according to the related art is press-fitted into a bush cup 38 mounted at the mounting part of the subframe in a vertical direction using an oil-hydraulic press, or the like. Here, the mounting bush 30 has a hook 32a formed at an upper end portion thereof to thereby be hooked onto an upper end of the bush cup 38, and has a flange 32b formed at a lower end portion thereof to thereby contact a lower end of the bush cup 38, such that a position thereof is fixed.

In this state, at the time of occurrence of the collision, the vehicle body is pushed, such that the inner pipe 34 coupled to the vehicle body by a bolt B is twisted. In the case in which the inner pipe 34 is twisted at a predetermined angle or more, the flange 32b formed at the lower end portion of the outer pipe 32 is fractured, such that the mounting bush 30 is separated from the subframe.

In order to prevent a problem that the mounting bush 30 is separated after assembling of the mounting bush 30 is completed, the mounting bush 30 has been controlled to have separation force of a predetermined load or more. To this end, the mounting bush 30 according to the related art has the hook 32a formed at the upper end of the outer pipe 32 to thereby be hooked onto the upper end of the bush cup 38, such that the position thereof is fixed, and has the flange 32b formed at the lower end of the outer pipe 32 to thereby contact the lower end of the bush cup 38. Therefore, when the mounting bush 30 according to the related art is press-fitted into and assembled to the bush cup 38, the hook 32a of the outer pipe 32 contacts an inner surface of the bush cup 38, such that deformation occurs inwardly by a protrusion amount of the hook 32a, thereby causing damage due to friction.

In addition, according to the related art, the mounting bush 30 is formed in an oval shape and is press-fitted into the bush cup 38 to secure separation force of the mounting bush 30.

However, since the outer pipe 32 is formed using the plastic in order to improve the collision performance, the outer pipe 32 of the mounting bush 30 formed in the oval shape is damaged due to restoring force of the buffering rubber 36, and the mounting bush 30 is not separated from the subframe due to elastic restoring force of the buffering rubber 36 at the time of the collision.

As described above, the mounting bush should be configured so as to be easily separated from the subframe at the time of the collision and so as not to be separated from the subframe at ordinary times.

However, although the mounting bush according to the related art is provided with the outer pipe formed of the plastic in order to secure the collision performance, a durability performance problem that the outer pipe is damaged when the mounting bush is press-fitted into and assembled to the bush cup of the subframe occurs. In addition, a collision performance problem that the mounting bush formed in the oval shape is not separated from the subframe at the time of the collision of the vehicle also occurs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a subframe mounting bush capable of satisfying both of collision performance and durability performance while maintaining vibration performance thereof.

According to various aspects of the present invention, a subframe mounting bush may include an outer pipe provided in a subframe and divided into at least two or more outer divided parts in a vertical direction, an inner pipe inwardly spaced apart from the outer pipe by a predetermined gap and divided into at least two or more inner divided parts in the vertical direction, and a buffering rubber interposed between the outer pipe and the inner pipe and divided into at least two or more rubber divided parts in the vertical direction.

The outer divided parts of the outer pipe, the inner divided parts of the inner pipe, and the rubber divided parts of the buffering rubber may be divided in the vertical direction along a common horizontal line.

The outer pipe, the inner pipe, and the buffering rubber may be divided so that each outer divided part, inner divided part, and rubber divided part positioned at an upper side are formed at a shortest length.

The outer pipe, the inner pipe, and the buffering rubber may be divided so that each outer divided part, inner divided part, and rubber divided part positioned at a lower side are formed at a shortest length.

The outer pipe may be divided so that a plurality of outer divided parts are spaced apart from each other by a predetermined gap in the vertical direction.

The buffering rubber may be divided so that a plurality of rubber divided parts are spaced apart from each other by a predetermined gap in the vertical direction.

The inner divided parts may have a catching protrusion and a catching groove each formed on end surfaces of the inner divided parts positioned at an upper side and the inner divided parts positioned at a lower side, facing each other, the catching protrusion and the catching groove corresponding to each other.

The subframe may be provided with a member mounting part formed by connecting an upper plate and a lower plate to each other, a bush housing formed of a hollow part and having the outer pipe fitted therein may be mounted in the member mounting part, and flanges of the bush housing caught by and contacting the upper plate and the lower plate of the subframe may be extended and formed at upper and lower ends of the bush housing.

Corresponding flanges of the outer pipe caught by and contacting flanges formed at upper and lower ends of a bush housing may be formed at an upper end of the outer divided parts positioned at an upper side of the outer pipe and a lower end of the outer divided parts positioned at a lower side of the outer pipe, respectively.

The outer pipe may be formed of a plastic material.

The two or more rubber divided parts of the buffering rubber may be formed of different materials.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to a subframe mounting bush capable of securing collision performance for allowing the subframe mounting bush to be smoothly separated from a subframe at the time of collision of a vehicle and durability performance for minimizing occurrence of a durability problem at the time of assembling the subframe mounting bush to the subframe.

Figure 2:
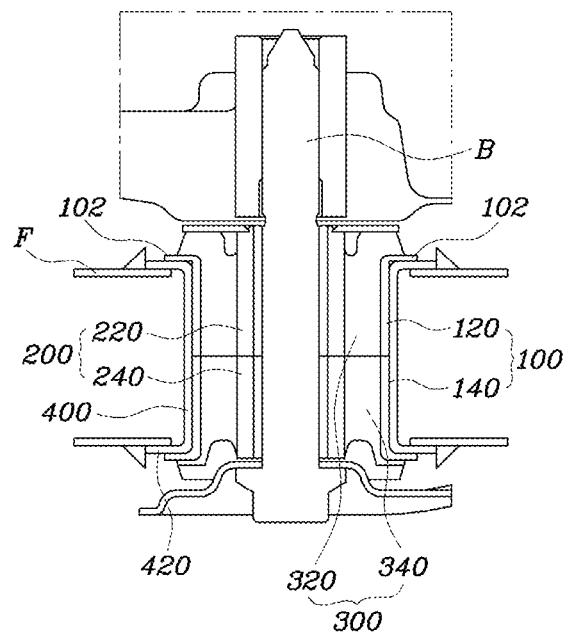
FIG. 2 is a view showing an exemplary subframe mounting bush according to the present invention.

Subframe mounting bushes according to various embodiments of the present invention are shown in FIG. 2, FIG. 3A, FIG. 3B, FIG. 3C and FIG. 4, FIG. 5, FIG. 6, and FIG. 7. A subframe mounting bush according to the present invention is configured to include an outer pipe 100 provided in a subframe F and formed so as to be divided into at least two or more outer divided parts 120 and 140 in a vertical direction, an inner pipe 200 inwardly spaced apart from the outer pipe 100 by a predetermined gap and formed so as to be divided into at least two or more inner divided parts 220 and 240 in the vertical direction, and a buffering rubber 300 interposed between the outer pipe 100 and the inner pipe 200 and formed so as to be divided into at least two or more rubber divided parts 320 and 340 in the vertical direction, as shown in FIG. 2.

In the present invention, the outer pipe 100 may be formed of a plastic material. Since the outer pipe 100 is formed of the plastic material, it is fractured at the time of the collision of the vehicle to thereby be separated from the subframe F.

In addition, in the present invention, the buffering rubber 300 is configured so as to be divided into two or more parts, thereby making it possible to freely set a vibration insulation feature at a degree of freedom higher than that of an existing mounting bush formed of rubber. That is, vibration insulation features of the two or more rubber divided parts 320 and 340 forming the buffering rubber 300 are set to be different from each other, such that the two or more rubber divided parts 320 and 340 may be tuned and applied so as to be appropriate for various vehicles.

More preferably, the two or more rubber divided parts 320 and 340 of the buffering rubber 300 may be formed of different materials. That is, since vibrations transferred to the vehicle are different, the rubber divided parts 320 and 340 are formed of different materials so as to be appropriate for the vibration insulation feature of the vehicle, thereby making it possible to further improve vibration and noise decrease features.

As an example, an upper portion of the rubber divided parts 320 and 340 of the buffering rubber 300 may be formed of urethane and a lower portion thereof may be formed of rubber, thereby making it possible to variously tune and set the rubber divided parts 320 and 340 so as to be appropriate for a vibration feature of the vehicle.

Figure 3A:
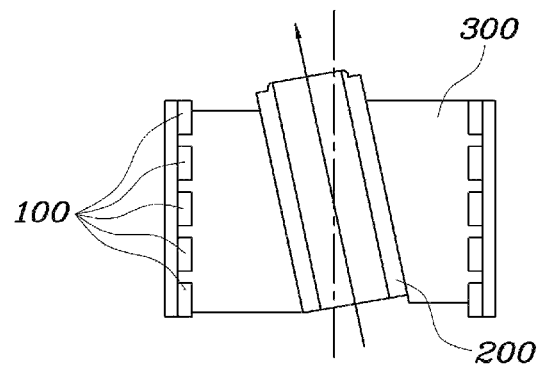
FIG. 3A, FIG. 3B and FIG. 3C are views showing a process in which the exemplary subframe mounting bush according to the present invention is separated from a subframe.
Figure 3B:
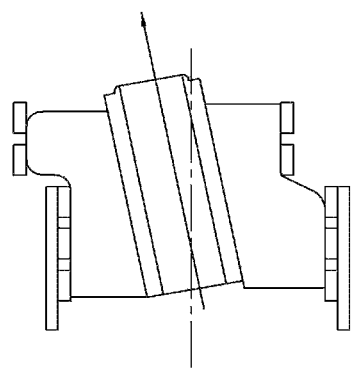
Figure 3C:
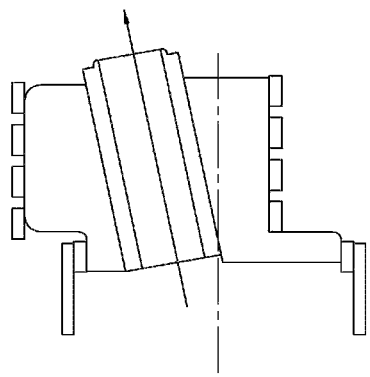

In the present invention, the outer pipe 100, the inner pipe 200, and the buffering rubber 300 are configured so as to be horizontally divided, respectively, such that they are smoothly separated from the subframe F. For example, in the subframe mounting bush for securing collision performance as shown in FIG. 3A, FIG. 3B, and FIG. 3C, the inner pipe 200 coupled to a vehicle body through a bolt is pushed while deforming the buffering rubber 300 at the time of the collision of the vehicle. Therefore, the outer pipe 100 is deformed by the pushed inner pipe 200, such that it is separated from the subframe F. In the present invention, the outer pipe 100, the inner pipe 200, and the buffering rubber 300 are configured so as to be divided into a plurality of parts in the vertical direction, such that the outer pipe 100, the inner pipe 200, and the buffering rubber 300 are flexibly separated from the subframe F through joints of the divided parts at the time of the collision.

A core configuration of the present invention as described above may be to configure the outer pipe 100 using a plurality of outer divided parts 120 and 140. Since the outer pipe 100 according to the related art is configured of one cylinder, even though the collision of the vehicle occurs, a problem that the outer pipe 100 is hooked onto the subframe F or is not separated from the subframe F due to excessive friction has occurred. However, the outer pipe 100 according to the present invention is configured so as to be divided into the plurality of outer divided parts 120 and 140, such that the outer divided parts are sequentially separated flexibly from the subframe F at the time of the collision of the vehicle.

Meanwhile, the buffering rubber 300 is configured so as to be divided into a plurality of rubber divided parts 320 and 340, such that the plurality of rubber divided parts 320 and 340 are flexibly separated, together with the outer divided parts 120 and 140, from the subframe F at the time of the collision. Here, the buffering rubber 300 is divided into the plurality of rubber divided parts 320 and 340, which are divided in the vertical direction from one buffering rubber 300. Therefore, an entire amount of rubber configuring the buffering rubber 300 is not changed. That is, since a vibration damping characteristic value depending on the amount of rubber in the buffering rubber 300 is not changed, initially set unique vibration damping performance may be maintained, and since the buffering rubber 300 is configured so as to be divided at the time of the collision, the subframe mounting bush may be smoothly separated.

Meanwhile, the inner pipe 200 is formed so as to be divided into a plurality of inner divided parts 220 and 240. Although the inner pipe 200 is configured of the plurality of inner divided parts 220 and 240, since the inner pipe 200 is coupled to the vehicle body through the bolt, it has the same structure as that of the inner pipe made of one cylinder. As described above, the reason why the inner pipe 200 is configured so as to be divided into the plurality of inner divided parts 220 and 240 is to consider an assembling feature of the subframe mounting bush. This will be again described below in a description for assembling of the subframe mounting bush.

Figure 7:
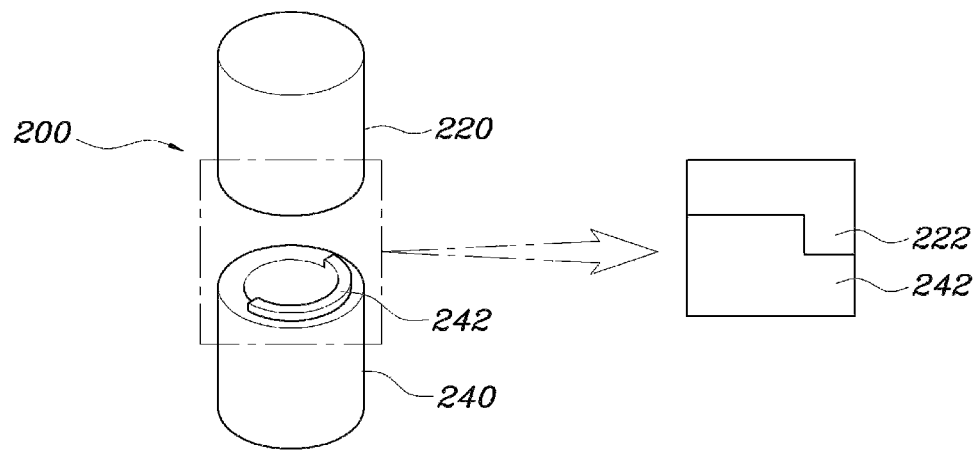
FIG. 7 is a view showing a contact end surface of an inner pipe of the exemplary subframe mounting bush according to the present invention.

Here, the inner divided parts 220 and 240 of the inner pipe 200 need to be configured so as not to be rotated, respectively. To this end, as shown in FIG. 7, the plurality of inner divided parts 220 and 240 have a catching protrusion 222 and a catching groove 242 each formed on end surfaces of the inner divided part 220 positioned at an upper side and the inner divided part 240 positioned at a lower side, facing each other, wherein the catching protrusion 222 and the catching groove 242 correspond to each other.

That is, the catching protrusion 222 extending and protruding along a circumference by a predetermined length is formed on a lower end surface of the inner divided part 220 positioned at the upper side, and the catching groove 242 corresponding to the catching protrusion 222 is formed on an upper end surface of the inner divided part 240 positioned at the lower side, such that the respective inner divided parts 220 and 240 are not relatively rotated by the catching between the catching protrusion 222 and the catching groove 242.

As described above, the plurality of inner divided parts 220 and 240 may prevent sliding on contact end surfaces between the inner divided parts 220 and 240 using the catching protrusion 222 and the catching groove 242. In various embodiments, knurling is performed on contact end surfaces between the inner divided parts 220 and 240 to increase frictional force, thereby making it possible to limit generation of the sliding.

In the subframe mounting bush according to the present invention as described above, as shown in FIG. 4, the outer divided parts 120 and 140 of the outer pipe 100, the inner divided parts 220 and 240 of the inner pipe 200, and the rubber divided parts 320 and 340 of the buffering rubber 300 may be divided in the vertical direction on the same horizontal line.

In various embodiments shown in FIG. 2, the outer pipe 100, the inner pipe 200, and the buffering rubber 300 are configured so as to be divided into two parts, that is, upper and lower parts, and the outer pipe 100, the inner pipe 200, and the buffering rubber 300 are divided on the center line, such that the subframe mounting bush may be divided after it is sufficiently deformed.

Figure 4:
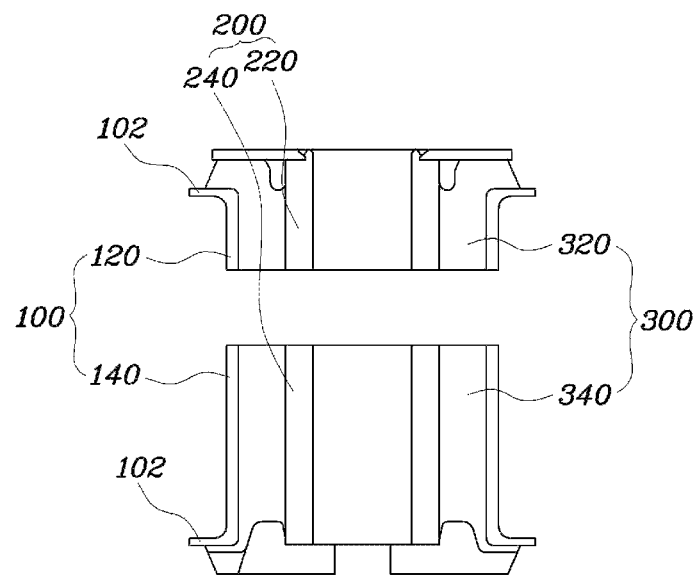
FIG. 4 is a view showing an exemplary subframe mounting bush according to the present invention.
Figure 5:
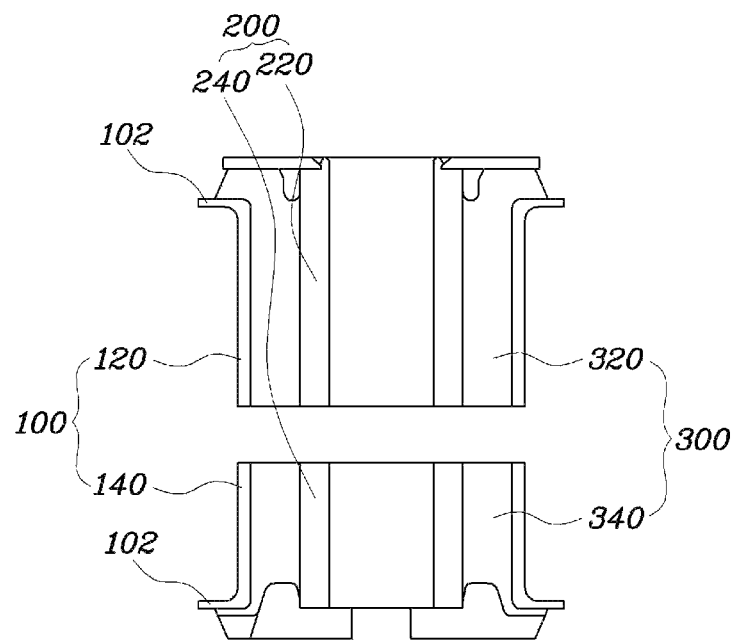
FIG. 5 is a view showing an exemplary subframe mounting bush according to the present invention.

The outer pipe 100, the inner pipe 200, and the buffering rubber 300 may be divided so that the outer divided part 120, the inner divided part 220, and the rubber divided part 320 positioned at the upper side are formed at the shortest length, i.e. a length shorter than the outer divided part 140, the inner divided part 240, and the rubber divided part 340 positioned at the lower side as in various embodiments shown in FIG. 4, and may be divided so that the outer divided part 140, the inner divided part 240, and the rubber divided part 340 positioned at the lower side are formed at the shortest length, i.e. i.e. a length shorter than the outer divided part 140, the inner divided part 240, and the rubber divided part 340 positioned at the upper side as in various embodiments shown in FIG. 5.

As described above, divided positions of the outer divided parts 120 and 140, the inner divided parts 220 and 240, and the rubber divided parts 320 and 340 may be set to appropriate positions in consideration of separation force of the subframe mounting bush depending on collision force. In addition, the outer pipe 100 is not divided into two parts at the upper and lower sides, but is divided into more parts, thereby making it possible to allow the separation depending on the collision to be smoothly performed by a more flexible structure.

Figure 6:
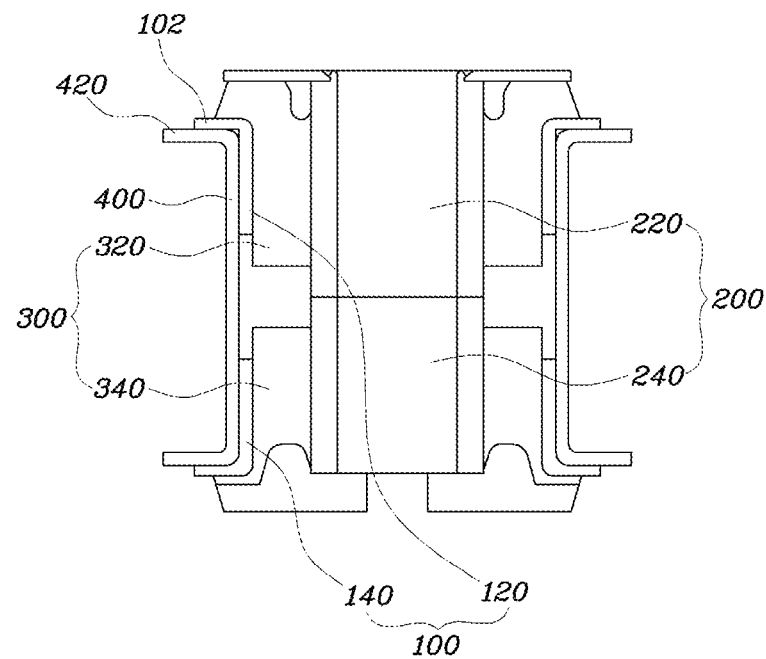
FIG. 6 is a view showing an exemplary subframe mounting bush according to the present invention.

Meanwhile, as in various embodiments shown in FIG. 6, the outer pipe 100 may be divided so that the plurality of outer divided parts 120 and 140 are spaced apart from each other by a predetermined gap in the vertical direction. In addition, the buffering rubber 300 may be divided so that the plurality of rubber divided parts 320 and 340 are spaced apart from each other by a predetermined gap in the vertical direction.

The outer pipe 100 is formed so that the outer divided part 120 positioned at the upper side and the outer divided part 140 positioned at the lower side are spaced apart from each other, such that the outer pipe 100 may be implemented so as to be more easily separated at the time of the collision and a length of the outer pipe 100 may be decreased to decrease a production cost. A spaced distance between the plurality of outer divided parts 120 and 140 may be adjusted in consideration of the separation force depending on a collision amount.

Meanwhile, the buffering rubber 300 may also be formed so that the rubber divided part 320 positioned at the upper side and the rubber divided part 340 positioned at the lower side are spaced apart from each other. As described above, the plurality of rubber divided parts 320 and 340 are formed so as to be spaced apart from each other and be divided to decrease an amount of rubber by a spaced space, thereby making it possible to decrease a manufacturing cost and adjust the separation force depending on a deformation amount of the subframe mounting bush at the time of the collision. A spaced distance between the rubber divided parts may be set in consideration of vibration damping characteristics of the buffering rubber 300 and the separation force of the subframe mounting bush.

Figure 8:
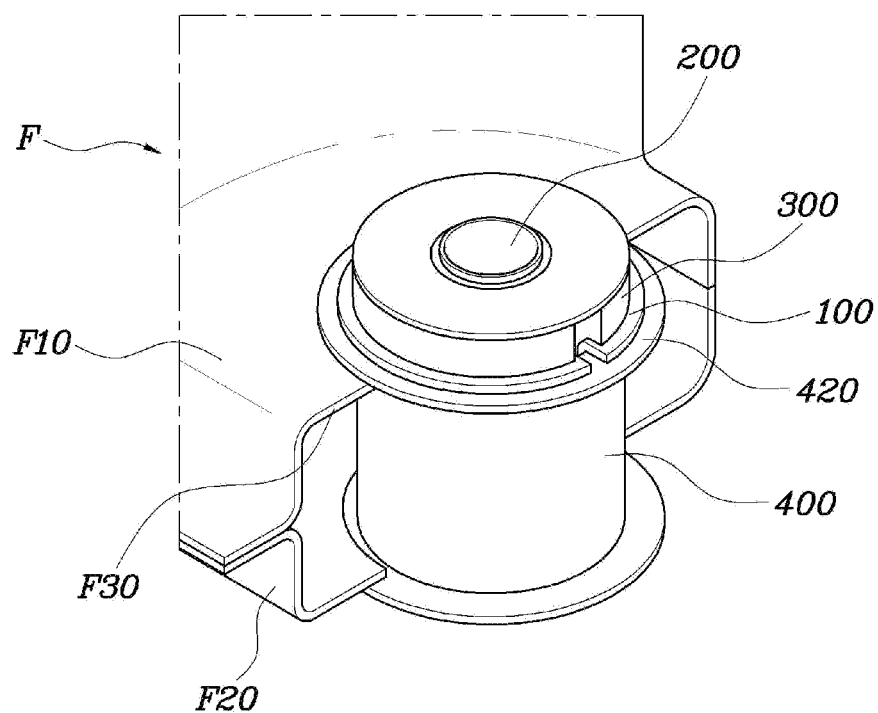
FIG. 8 is a view showing a form in which an exemplary subframe mounting bush according to the present invention is mounted at the subframe.

Meanwhile, as shown in FIG. 8, the subframe F may be provided with a member mounting part F30 formed by connecting an upper plate F10 and a lower plate F20 to each other, a bush housing 400 formed of a hollow part and having the outer pipe 100 fitted therein may be mounted in the member mounting part F30, and flanges 420 caught by and contacting the upper plate F10 and the lower plate F20 of the subframe F may be extended and formed at upper and lower ends of the bush housing 400.

Here, corresponding flanges 102 caught by and contacting the flanges 420 formed at the upper and lower ends of the bush housing 400 may be formed at an upper end of the outer divided part 120 positioned at the upper side of the outer pipe 100 and a lower end of the outer divided part 140 positioned at the lower side of the outer pipe 100, respectively.

Figure 1:
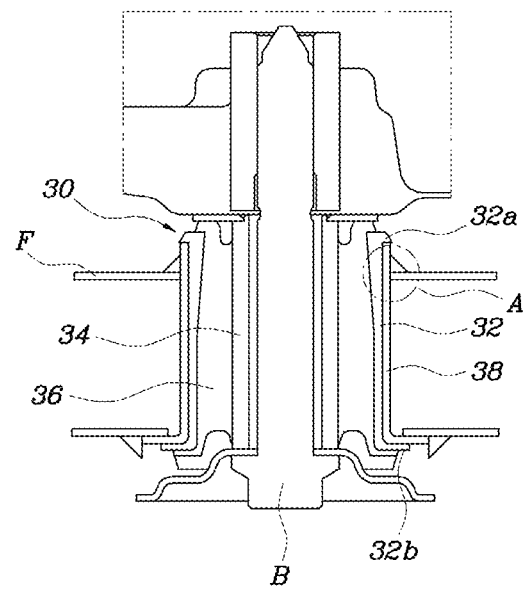
FIG. 1 is a view showing a mounting bush according to the related art.

In the present invention, the flanges 420 caught by and contacting the upper plate F10 and the lower plate F20 of the subframe F are formed at the upper and lower ends of the bush housing 400, thereby making it possible to further enhance a coupling structure in the subframe F. That is, according to the related art, the member mounting part F30 of the subframe F was formed in a hole shape, a bush cup was inserted into the member mounting part F30 and was then welded, thereby performing the mounting of the bush. However, since the bush cup according to the related art is fitted and is then welded to the subframe F, a weakly welded portion A (See FIG. 1) is generated, such that rigid connection is not made.

On the other hand, in the present invention, the member mounting part F30 of the subframe F is formed so that the bush housing 400 is fitted therein sideward, and the flanges 420 formed at the upper end and the lower end are caught by and contact the upper plate F10 and the lower plate F20 of the subframe F at the time of fitting the bush housing 400 into the member mounting part F30. In this state, the flanges 420 of the bush housing 400 and the subframe F are welded to each other, thereby making it possible to secure rigid coupling force of the bush housing 400.

The corresponding flanges 102 corresponding to the flanges 420 of the bush housing 400 are formed at the outer pipe 100 fitted into the bush housing 400, thereby making it possible to allow the outer pipe 100 mounted in the bush housing 400 not to be separated to the outside.

In detail, the corresponding flanges 102 caught by and contacting the flanges 420 formed at the upper end and the lower end of the bush housing 400 are formed at the upper end of the outer divided part 120 positioned at the upper side of the outer pipe 100 and the lower end of the outer divided part 140 positioned at the lower side of the outer pipe 100, respectively. These corresponding flanges 102 surface-contact the flanges 420 of the bush housing 400 at the time of fitting the outer pipe 100 into the bush housing 400. That is, the corresponding flanges 102 of the outer pipe 100 are caught by the flanges 420 at the time of complete assembling for coupling the bolt to the inner pipe 200, such that movement of the outer pipe 100 in the vertical direction is limited to limit separation of the subframe mounting bush, and the corresponding flanges 102 are fractured at the time of the collision to allow the separation, such that the outer pipe 100 is separated from the bush housing 400. Separation force of the outer pipe 100 depending on the collision of the vehicle may be tuned by setting a thickness and a width of the corresponding flanges 102.

Figure 9:
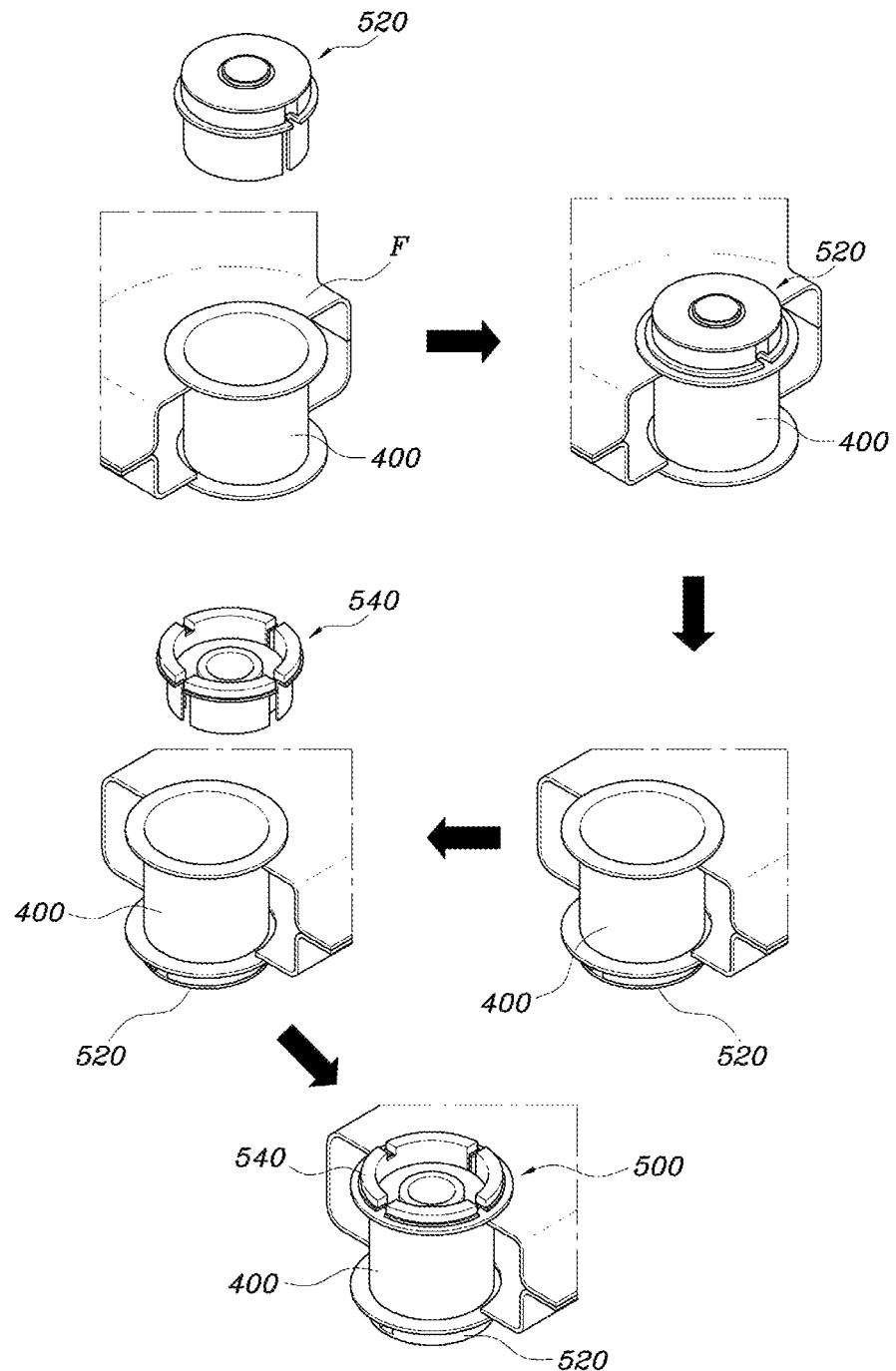
FIG. 9 is a view showing a process of assembling the subframe mounting bush according to the present invention.

Assembling of the subframe mounting bush according to the present invention will be described with reference to FIG. 9. The outer pipe 100, the inner pipe 200, and the buffering rubber 300 according to the present invention are configured so as to be divided in the vertical direction, such that they are mounted at the upper and lower sides of the subframe F, respectively.

In the mounting bush according to the related art, in order to mount the mounting bush in the subframe F and then prevent separation of the mounting bush from the subframe F, a hook structure was used at the upper end of the outer pipe. Therefore, a problem that the outer pipe is excessively deformed and damaged due to the hook at the time of fitting the mounting bush into the subframe F at a strong pressure has occurred.

The subframe mounting bush 500 according to the present invention may include an upper bush 520 and a lower bush 540 by dividing the outer pipe 100, the inner pipe 200, and the buffering rubber 300 into a plurality of parts, respectively, and a process of press-fitting the upper bush 520 into the bush housing 400 mounted in the subframe F downwardly and press-fitting the lower bush 540 into the bush housing 400 upwardly, using an oil-hydraulic press is performed. Here, the corresponding flanges 102 formed from the outer pipe 100 contact the flanges 420 of the bush housing 400 at an upper end of the upper bush 520 and a lower end of the lower bush 540, thereby making it possible to limit the separation of the subframe mounting bush when the bolt is coupled to the inner pipe 200.

In addition, since the hook structure according to the related art is removed and a fitting-coupling amount between the upper bush 520 and the lower bush 540 is not large, occurrence of a quality defect problem may be prevented, and the corresponding flange 102 formed in the upper bush 520 or the lower bush 540 is fractured at the time of the collision of the vehicle, such that the upper bush 520 or the lower bush 540 is sequentially separated flexibly from the subframe, thereby making it possible to allow the subframe mounting bush 500 and the subframe F to be smoothly separated from each other.

The subframe mounting bush having the structure as described above may be smoothly separated from the subframe F at the time of the collision of the vehicle since the outer pipe 100, the inner pipe 200, and the buffering rubber 300 are formed so as to be divided.

In addition, the outer pipe 100 is configured so as to be limited from being separated from the subframe F by the corresponding flanges 102 formed at the upper end and the lower end, the corresponding flanges 102 are fractured at the time of the collision of the vehicle to allow the subframe mounting bush to be separated from the subframe F, thereby limiting the separation of the subframe mounting bush at ordinary times and allowing the separation of the subframe mounting bush to be smoothly performed by the fracture of the flanges 420 at the time of the collision of the vehicle.

Further, in assembling the subframe mounting bush to the subframe, the outer pipe 100, the inner pipe 200, and the buffering rubber 300 that are divided are assembled at the upper and lower sides of the subframe, respectively, to minimize damage to the subframe mounting bush, thereby promoting improvement of productivity and an assembling feature.

The subframe mounting bush having the structure as described above may more freely set a vibration insulation feature and may be smoothly separated from the subframe at the time of the collision of the vehicle, since the outer pipe, the inner pipe, and the buffering rubber are formed so as to be divided.

In addition, the outer pipe is configured so as to be limited from being separated from the subframe by the corresponding flanges formed at the upper end and the lower end, the corresponding flanges are fractured at the time of the collision of the vehicle to allow the subframe mounting bush to be separated from the subframe, thereby limiting the separation of the subframe mounting bush at ordinary times and allowing the separation of the subframe mounting bush to be smoothly performed by the fracture of the flanges at the time of the collision of the vehicle.

Further, in assembling the subframe mounting bush to the subframe, the outer pipe, the inner pipe, and the buffering rubber that are divided are assembled at the upper and lower sides of the subframe, respectively, to minimize damage to the subframe mounting bush, thereby promoting improvement of productivity and an assembling feature.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A subframe mounting bush comprising:
   an outer pipe provided in a subframe and divided into at least two or more outer divided parts in a vertical direction of the outer pipe;
   an inner pipe inwardly spaced apart from the outer pipe by a predetermined gap and divided into at least two or more inner divided parts in the vertical direction of the inner pipe; and
   a buffering rubber interposed between the outer pipe and the inner pipe and formed divided into at least two or more rubber divided parts in the vertical direction of the buffering rubber,
   wherein the two or more inner divided parts have a catching protrusion and a catching groove each formed on end surfaces of inner divided parts of the two or more inner divided parts positioned at an upper side and the inner divided parts of the two or more inner divided parts positioned at a lower side, wherein the catching protrusion and the catching groove face each other and correspond to each other.

2. The subframe mounting bush of claim 1, wherein the outer divided parts of the outer pipe, the inner divided parts of the inner pipe, and the rubber divided parts of the buffering rubber are divided in the vertical direction along a common horizontal line.

3. The subframe mounting bush of claim 2, wherein the outer pipe, the inner pipe, and the buffering rubber are divided so that each of an outer divided part among the outer divided parts, an inner divided part among the inner divided parts, and a rubber divided part among the rubber divided parts positioned at an upper side is formed at a shortest length of the outer divided parts, at a shortest length of the inner divided parts, and at a shortest length of the rubber divided parts respectively.

4. The subframe mounting bush of claim 1, wherein the outer pipe, the inner pipe, and the buffering rubber are divided so that each of an outer divided part among the outer divided parts, an inner divided part among the inner divided parts, and a rubber divided part among the rubber divided parts positioned at a lower side is formed at a shortest length of the outer divided parts, at a shortest length of the inner divided parts, and at a shortest length of the rubber divided parts respectively.

5. The subframe mounting bush of claim 1, wherein the outer pipe is divided so that a plurality of outer divided parts are spaced apart from each other by a predetermined gap in the vertical direction.

6. The subframe mounting bush of claim 1, wherein the buffering rubber is divided so that a plurality of rubber divided parts are spaced apart from each other by a predetermined gap in the vertical direction.

7. The subframe mounting bush of claim 1, wherein the subframe is provided with a member mounting part formed by connecting an upper plate and a lower plate to each other,
   a bush housing formed of a hollow part and having the outer pipe fitted therein is mounted in the member mounting part, and
   flanges of the bush housing caught by and contacting the upper plate and the lower plate of the subframe are extended and formed at upper and lower ends of the bush housing.

8. The subframe mounting bush of claim 1, wherein corresponding flanges of the outer pipe caught by and contacting flanges formed at upper and lower ends of a bush housing are formed at an upper end of the outer divided parts positioned at an upper side of the outer pipe and at a lower end of the outer divided parts positioned at a lower side of the outer pipe, respectively.

9. The subframe mounting bush of claim 1, wherein the outer pipe is formed of a plastic material.

10. The subframe mounting bush of claim 1, wherein the two or more rubber divided parts of the buffering rubber are formed of different materials.

* * * * *